(12) United States Patent
Zhou et al.

(10) Patent No.: US 10,858,380 B2
(45) Date of Patent: Dec. 8, 2020

(54) PHOTO ACTIVE AGENTS

(71) Applicant: Hewlett-Packard Development Company, L.P., Spring, TX (US)

(72) Inventors: Zhang-Lin Zhou, San Diego, CA (US); Marisa Samoshin, San Diego, CA (US); Rodney David Stramel, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/463,050

(22) PCT Filed: Apr. 3, 2017

(86) PCT No.: PCT/US2017/025700
§ 371 (c)(1),
(2) Date: May 22, 2019

(87) PCT Pub. No.: WO2018/186822
PCT Pub. Date: Oct. 11, 2018

(65) Prior Publication Data
US 2019/0276482 A1    Sep. 12, 2019

(51) Int. Cl.
| | |
|---|---|
| C08F 2/46 | (2006.01) |
| C08F 2/50 | (2006.01) |
| C08G 61/04 | (2006.01) |
| C07F 9/30 | (2006.01) |
| C09D 11/38 | (2014.01) |
| C09D 11/40 | (2014.01) |
| C09D 11/101 | (2014.01) |
| C09D 11/322 | (2014.01) |
| C09D 11/54 | (2014.01) |

(52) U.S. Cl.
CPC ............. *C07F 9/307* (2013.01); *C07F 9/301* (2013.01); *C08F 2/50* (2013.01); *C09D 11/101* (2013.01); *C09D 11/322* (2013.01); *C09D 11/38* (2013.01); *C09D 11/40* (2013.01); *C09D 11/54* (2013.01)

(58) Field of Classification Search
CPC .......... C07F 9/307; C07F 9/301; C09D 11/38; C09D 11/40
USPC ........... 522/38, 33, 6, 71, 189, 184, 1; 520/1
See application file for complete search history.

(56) References Cited

U.S. PATENT DOCUMENTS

| | | | |
|---|---|---|---|
| 3,328,319 A | 6/1967 | Klement et al. | |
| 2016/0039851 A1* | 2/2016 | Muller | C07F 9/307 |
| | | | 522/49 |
| 2016/0168177 A1* | 6/2016 | Cunningham | G03F 7/027 |
| | | | 522/11 |

FOREIGN PATENT DOCUMENTS

| | | | |
|---|---|---|---|
| CN | 102924509 A † | 2/2013 | |
| JP | 2014196425 | 10/2014 | |
| WO | 2006056541 | 6/2006 | |
| WO | 2013020469 | 2/2013 | |
| WO | 2014095724 | 6/2014 | |
| WO | 2014095724 A1 † | 6/2014 | |
| WO | WO-2014095724 A1 * | 6/2014 | ............. G03F 7/029 |

OTHER PUBLICATIONS

Benedikt et al, Highly Efficient Water-soluble Visible Light Photoinitaitors, Oct. 5, 2015, Journal of Polymer Science, Part A: Polymer Chemistry 2016, 54, 473-479 (Year: 2015).*
Brun et al., New Double-Chain and Aromatic (a-Hydroxyalkyl)phosphorus Amphiphiles, Synthesis 2002(10): 1385-1390.
Albouy et al., Phosphorylating Power of Red Phosphorus towards Aldehydes in Basic and in Acidic Media, European Journal of Organic Chemistry, vol. 1999, Issue 4, Apr. 1999.
Kaboudin et al., A Novel Method for the Separation of Bis(a-hydroxyalkyl)phosphinic Acid Diastereoisomers via Formation of Novel Cyclic Phosphinic Acids, J. Org. Chem., 2006, 71(17).
Kaboudin et al., A novel synthesis of bis-(a-hydroxyalkyl)phosphinic acids involving microwave irradiation, Tetrahedron Letters, vol. 45, Issue 49, Nov. 29, 2004.
Muller et al., Simple One-Pot Synthesis of Water-Soluble Bis(acyl)phosphane Oxide Photoinitiators and Their Application in Surfactant-Free Emulsion Polymerization, Macromolecular Rapid Communications, vol. 36, Issue 6.

(Continued)

*Primary Examiner* — Jessica Whiteley
(74) *Attorney, Agent, or Firm* — Thorpe North & Western LLP

(57) ABSTRACT

The present disclosure is drawn to a photo active agent which includes a bisacylphosphinic compound in the form of an acid or salt having Structure I: where A and A' are independently aryl or from C2 to C8 lower alkyl; M is H, a monovalent cation, a divalent cation, or mixture thereof; n is 1 or 2; and q is 1 or 2. The photo active agent can be present in a composition that includes from 0.001 wt % to 5 wt % of a dialcohol phosphinic acid precursor or dialcohol phosphinic salt of the bisacylphosphinic compound of Structure I.

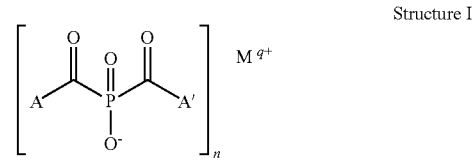

Structure I

17 Claims, 1 Drawing Sheet

(56) References Cited

OTHER PUBLICATIONS

Prishchenko et al., Synthesis of new functionalized mono- and bisorganophosphorus acids and their derivatives with unsaturated and aromatic fragments, Heteroatom Chemistry, vol. 23, Issue 1, 2012.
International Search Report dated Dec. 14, 2017 for PCT/US2017/025700, Applicant Hewlett-Packard Development Company, L.P.
G. Müller et al., Simple One-Pot Synthesis of Water-Soluble Bis(acyl)phosphane Oxide Photoinitiators and Their Application in Surfactant-free Emulsion Polymerization, 553-557, Feb. 4, 2015, Macromol. Rapid Commun., vol. 36.†

\* cited by examiner
† cited by third party

PHOTO ACTIVE AGENTS

BACKGROUND

Recently, curing of ink by radiation, and in particular ultraviolet (UV) curing, has become popular. UV curable ink can be cured after printing by application of UV light. Typically, UV curable inks include monomers that form polymers by free radical polymerization. The growing end of each polymer chain is a radical that reacts with additional monomers, transferring the radical to the end of the chain as each monomer is added. A photo initiator can be used to form the first radicals to begin the polymerization process. The photo initiator can be capable of absorbing UV light to generate radicals to react with the monomers.

Two types of photo initiators can be used in UV curable compositions. Type I photo initiators are unimolecular photo initiators that undergo a hemolytic bond cleavage upon absorption of UV light, forming radicals. Type II photo initiators are bimolecular photo initiators. These are used as a system of a photo initiator with a synergist, which can together form radicals upon exposure to UV light. Some type II photo initiators react by hydrogen abstraction from the synergist to the photo initiator.

DETAILED DESCRIPTION

Figure 1:
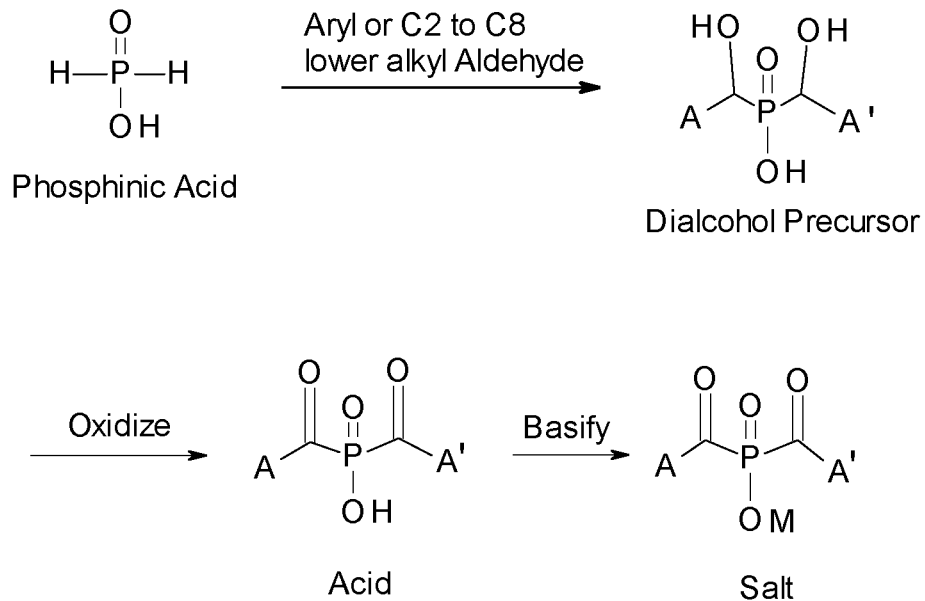
FIG. 1 is an example of a general scheme of forming a biacylphosphinic acid or salt in accordance with the present disclosure.

The inkjet printing industry uses various types of inks, such as oil-based inks, solvent-based (non-aqueous) inks, water-based (aqueous) inks, and solid inks which are melted in preparation for dispensing. Solvent-based inks are fast drying, and as a result, are widely used for industrial printing. When solvent-based inks containing binders and other ingredients are jetted onto a substrate, the solvent(s) partially or fully evaporate from the ink, leaving the binder and other ingredients such as pigment particles on the printed substrate in the form of a dry film. During the drying process, the solvents, which are often volatile organic compounds (VOC), emit vapors, and therefore can pollute the environment. The amount of pollution produced can increase greatly with higher printing speeds or for wide format images, where large amounts of ink are deposited onto a substrate.

As a result of this and other concerns, efforts related to preparing inks that are environmentally friendly have moved some research in the direction of water-based inks. However, radiation-curable (or photo-curable) water-based ink compositions are noticeably limited as it relates to available photo active agent options due to their specific formulation properties. For example, even though one can use dispersions of photo initiators along with a dispersant, there are still crystallization issues that can get introduced at high concentrations in the ink. Thus, it would be desirable to develop UV reactive photo active agents, including those that may also be stable in photo curable ink formulations, have relatively high water solubility, and/or are chemical stable. In some specific examples, photo active agents can be used as photo initiators, or as sensitizers for use with other photo initiators. These photo active agents can be used in the UV electromagnetic range, and in some examples, may even have high reactivity when exposed to commercially available UV-LED lights in the range of 350 nm to 420 nm, e.g., 365 nm, 395 nm, etc.

Accordingly, the present disclosure is drawn to photo active agents that can be used as photo initiators, sensitizers, or both. More specifically, the present disclosure provides photo active agents including a bisacylphosphinic compound. These photo active agents can be water soluble and stable in aqueous inks, such as aqueous thermal inkjet inks, for example.

In one example, a photo active agent can include a bisacylphosphinic compound in the form of an acid or salt, as shown in Structure I, as follows:

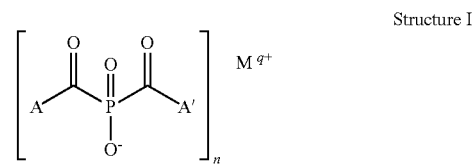

Structure I where A and A' are independently aryl or from C2 to C8 lower alkyl; M is H, a monovalent cation, a divalent cation, or mixture thereof; n is 1 or 2; and q is 1 or 2. For example, when Structure I is an acid, M is H, n is 1 and q is 1. When Structure I has undergone basification where it is salted or in a more basic form, M can be an alkali metal such as lithium, potassium, or sodium, or M can be an alkaline earth metal, such as magnesium or calcium. In other examples, other monovalent or divalent cations can be used, In some examples, when salting Structure I by basification, M can be from 99% to 100% monovalent or divalent cation and from 0% to 1% H, by atoms. In other words, even when Structure I is a salt, there can still be some H present, depending on the pH and the available cations present in the basification reaction. Below are two examples of structures that may be formed in accordance with Structure I:

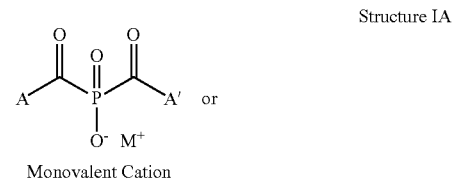

Structure IA

Monovalent Cation

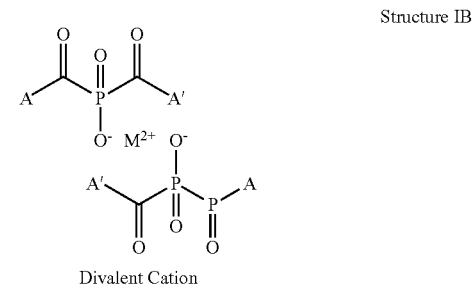

Structure IB

Divalent Cation where A and A' are independently aryl or from C2 to C8 lower alkyl; M is a monovalent cation in Structure IA, and M is a divalent cation in Structure 1B. Example monovalent cations can include lithium, potassium, or sodium. Example divalent cations can include magnesium or calcium.

The photo active agent, or bisacylphosphinic compound, can be present in a composition that also includes, typically in small or residual amounts, e.g., from 0.001 wt % to 5 wt %, a dialcohol phosphinic acid precursor or dialcohol phosphinic salt of Structure I. This compound is shown in Structure II, as follows:

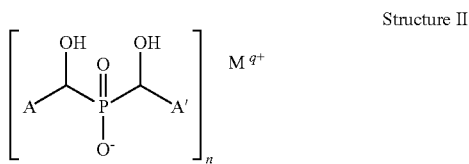

Structure II where A and A' are independently aryl or from C2 to C8 lower alkyl; M is H, a monovalent cation, a divalent cation, or mixture thereof; n is 1 or 2; and q is 1 or 2. When forming the bisacylphosphinic acid of Structure I, Structure II can typically be in acid form where M is H, and n and q are both 1. However, if the bisacylphosphinic acid or Structure I is salted by basification, then the residual dialcohol phosphinic acid precursor can alternatively be salted in the composition.

In one specific example, the photo active agent, or bisacylphosphinic compound of Structure I can be prepared such that A and A' both include a 2,4,6-trimethyl group. This compound is shown at Structure III:

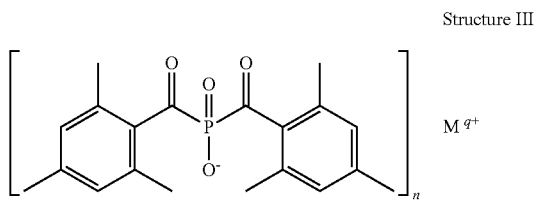

Structure III where M is H, a monovalent cation, a divalent cation, or mixture thereof; n is 1 or 2, and q is 1 or 2, for example. In this example, the photo active agent can be present in a composition that may also include a dialcohol phosphinic acid precursor or dialcohol phosphinic salt of Structure III. The precursor (or salt thereof) can have the formula shown in Structure IV, as follows:

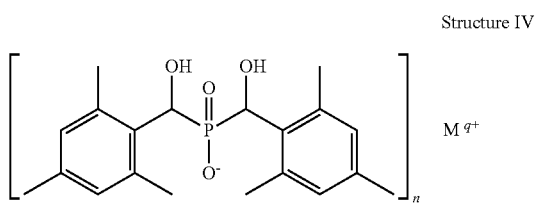

Structure IV where M is H, a monovalent cation, a divalent cation, or mixture thereof; n is 1 or 2, and q is 1 or 2.

In another example, FIG. 1 provides a general example for the preparation of the photo active agent, or bisacylphosphinic compound (acid or salt form), described herein. In this general reaction scheme, phosphinic acid is reacted with an aryl or C2 to C8 lower alkyl aldehyde to give a dialcohol precursor, which can be a dialcohol phosphinic acid precursor. The dialcohol phosphinic acid precursor can then be oxidized to form the acid, which is shown as a bisacylphosphinic acid (BAPO-acid). The BAPO-acid can undergo basification or salting to form the salt, which in this instance is a bisacylphosphinic salt (BAPO-salt). The BAPO-salt can be a 1:1 molar ratio ligand to monovalent cation salt (as shown), or a 2:1 molar ratio ligand to monovalent cation salt (not shown). Notably, in FIG. 1, A and A' can be independently aryl or from C2 to C8 lower alkyl; and M can be H, a monovalent cation, a divalent cation, or mixture thereof. Because M is present in the salted compound, if H is present, it may typically be present in minor amounts, depending on the cationic concentration and other reaction conditions.

Figure 2:
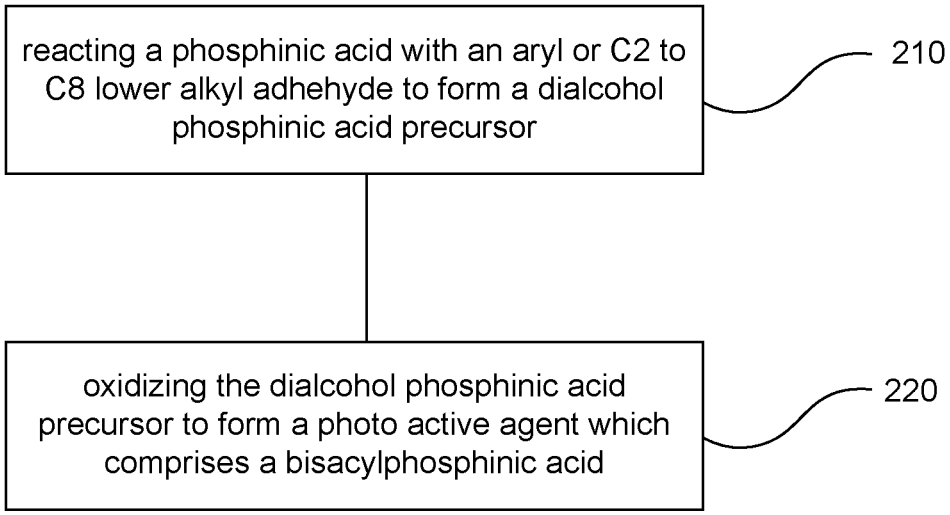
FIG. 2 depicts an example method of preparing a biacylphosphinic acid or salt in accordance with the present disclosure.

FIG. 2 provides a method of making a photo active agent including steps of reacting 210 a phosphinic acid with an aryl or C2 to C8 lower alkyl adhehyde to form a dialcohol phosphinic acid precursor, and oxidizing 220 the dialcohol phosphinic acid precursor to form the photo active agent which includes a bisacylphosphinic acid. In one more specific example, the method can further include basifying the bisacylphosphinic acid with a monovalent or divalent salt to form a bisacylphosphinic salt, which is the photo active agent in the form of a salt. In this example, the bisacylphosphinic compound can be as shown in Structure I above. In another example, the bisacylphosphinic compound can be present in a composition that further includes small or trace amounts, e.g., 0.001 wt % to 5 w %, of a dialcohol phosphinic acid or salt precursor of the bisacylphosphinic compound.

Thus, in one specific example, a method of making photo active agent can include steps of reacting a phosphinic acid with an aryl or C2 to C8 lower alkyl aldehyde to form a dialcohol phosphinic acid precursor, and oxidizing the dialcohol phosphinic acid precursor to form the photo active agent of Structure I, where A and A' are independently aryl or from C2 to C8 lower alkyl; M is H, a monovalent cation, a divalent cation, or mixture thereof; n is 1 or 2; and q is 1 or 2. In this specific example, the photo active agent can be present in a composition that also includes from 0.001 wt % to 5 wt % of a dialcohol phosphinic acid precursor or dialcohol phosphinic salt of the photo active agent shown in Structure I.

A more specific example of the general scheme shown in FIGS. 1 and 3 is provided below as Scheme 1 below. There, the reaction of phosphinic acid (8) with 2 equivalents of aldehyde (9) in a sealed tube at 100° C. gives a dialcohol phosphinic acid precursor (10), which can be oxidized under air in the presence of a catalyst which gave a bisacylphosphinic acid (11) or BAPO-acid. Treatment of BAPO-acid with an appropriate base, which is typically a salt of a monovalent cation or a salt of a divalent cation, can give a bisacylphosphinic salt (12) or BAPO-salt.

Scheme 1

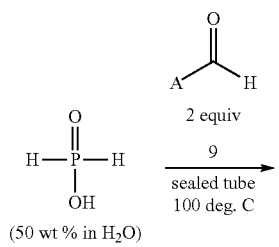

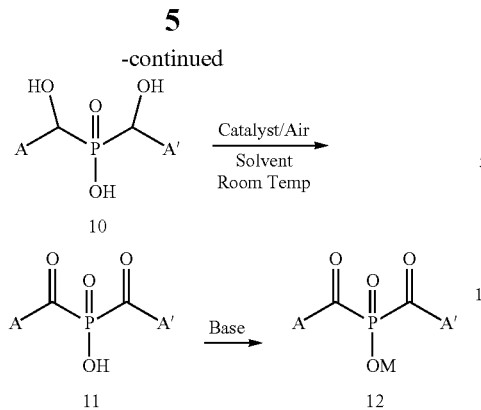

where A and A' are independently aryl or C2 to C8 lower alkyl. In this instance, A and A' can be the same. However, if a mixture of different aldehydes were used, A and A' could be different, for example. Furthermore, in this example, M is shown with a monovalent cation, like lithium, sodium, potassium, etc., which is shown generally at Structure IA above. However, if a divalent cation were used, such as magnesium or calcium, the structure can be similar to that shown at Structure IB.

Scheme 2 provides an example of facile synthesis of one or more specific BAPO-salt (16). In this reaction scheme, shown as Scheme 2 below, the reaction of phosphinic acid (8) with 2 equivalents of 2,4,6-trimethylbenzalddhyde 13 in a sealed tube at 100° C. gives dialcohol phosphinic acid precursor (14). The precursor can be oxidized under air in the presence of a catalyst to give BAPO acid (15). Treatment of the BAPO-acid with an appropriate base, such as a monovalent cation containing salt, gives the corresponding BAPO salts (16).

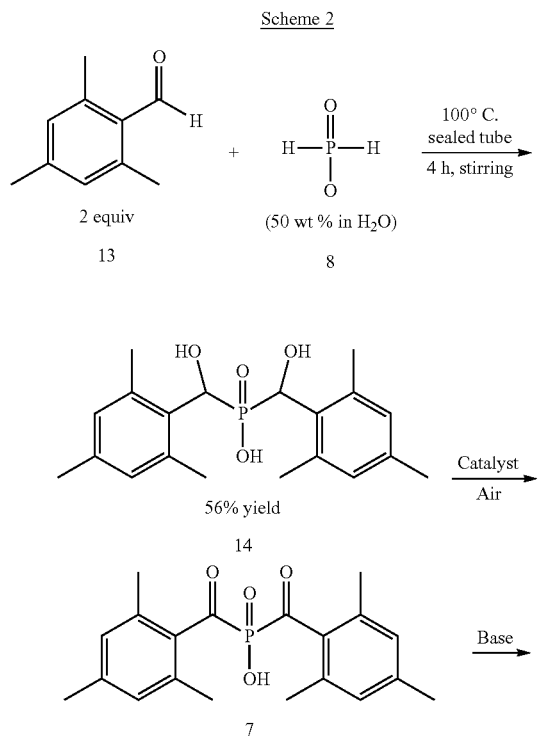

The oxidation of the dialcohol phosphinic acid precursor (14) can be carried out using certain oxidation conditions, but not all oxidation conditions produce product with good yield. In one example, the method can include using a certain reagents as a catalysts to oxidize the dialcohol phosphinic acid precursor in air. Example reagents that can work well include bpy/TEMPO/N M I/[Cu(MeCN)$_4$]OTf or bpy/ABNO/NMI//[Cu(MeCN)$_4$]OTf. In these formulations, bpy is 2,2-bipyridyl; TEMPO is 2,2,6,6-tetramethylpiperidine N-oxyl, ABNO is 9-azabicyclo[3,3,1]nonane N-oxyl, and NMI is N-methylimidazole. Using this catalyst or reagent, the dialcohol phosphinic acid precursor can be successfully converted to BAPO-acid at a reasonable high yield, e.g., greater than 40% yield, greater than 50% yield, or even greater than 60% yield. The % yield is based on the number of molecules that are converted from the precursor to the BAPO-acid. Examples of this are shown at Scheme 3, as follows:

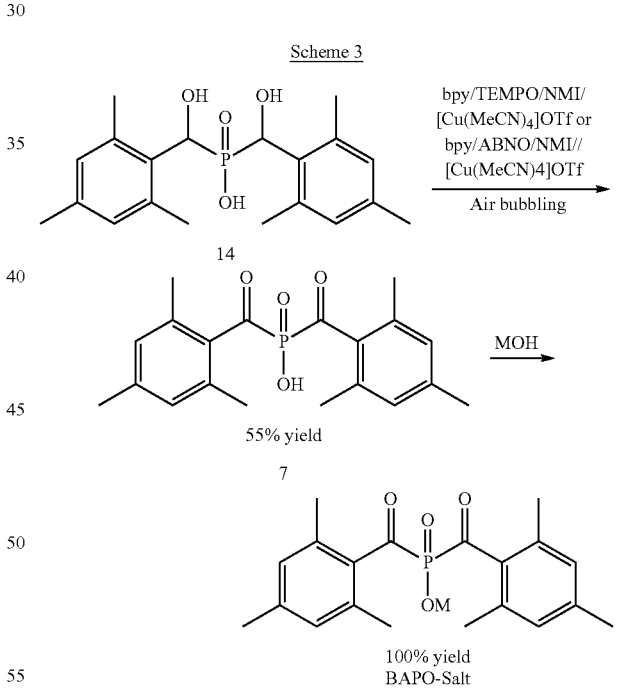

In another example, an alternative method shown at Scheme 4 below, oxidation of the dialcohol phosphinic acid precursor (14) can be carried out using TEMPO as a catalyst and 2,4,6-trichlorotriazine as an oxidation agent at room temperature for a short time, which results in a corresponding bisacylphosphinic acid (7) at a 60% yield. In this example, TEMPO is defined as a 2,2,6,6-tetramethyl-1-piperidinyloxy, free radical. The free acid can then be converted into its corresponding BAPO-salt in quantitative yield.

Scheme 4

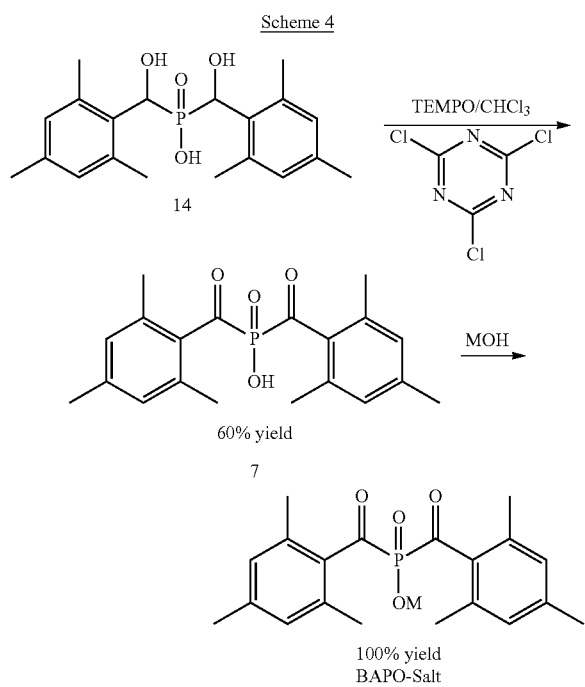

Notably, Schemes 2, 3, and 4 show specific BAPO-salt structures which include two 2,4,6-trimethylphenyl groups. Notably, other aromatic rings could alternatively be present, such as phenyl, C1 to C4 alkyl phenyl, C1 to C4 dialkyl phenyl, C1 to C4 trialkyl phenyl, 2,6-dialkylsubstituted phenyl, 2,6-diaryl substituted phenyl, or the like. In other examples, instead of the aryl side group, side groups such as C2 to C8 lower alkyl (branched or unbranched) can alternatively be present. Furthermore, in the final product where the BAPO-acid or BAPO-salt is formed, detectable amounts of pre-oxidation intermediate material can remain present, namely the corresponding dialcohol phosphinic acid that is used to form the BAPO-acid or the BAPO-salt. This material may be present in the final composition as the acid precursor or as a salted material (where the remaining or trace amounts of precursor material become salted during the basification process). Thus, oxidation of precursor material (7) is not typically 100% and thus, it may be difficult to be completely removed. This material can be detected by a LC-MS process, and thus, this material can be used to identify whether the processes provided herein were used to generate the BAPO-acid or BAPO-salts described herein.

In another example, these bisacylphosphinic compounds can be used to prepare photo curable ink. Thus, a photo curable ink can include a photo reactive binder; a photo active agent including a bisacylphosphinic compound in the form of an acid or salt as shown in Structure I; a co-photo active agent such as a photo initiator, a synergist, or a sensitizer; a colorant; and a liquid vehicle including co-solvent and water. In one example, the photo curable ink can further include a dialcohol phosphinic acid precursor or dialcohol phosphinic salt of Structure I, which may be a remaining intermediate or a byproduct of the photo active agent prepared in accordance with examples of the present disclosure. In another example, the bisacylphosphinic compound of Structure I can be the salt, and M can include lithium, sodium, potassium, magnesium, or calcium. For example, when M is lithium, sodium, or potassium, n and q can both be 1. Furthermore, when M is magnesium or calcium, n and q can both be 2. In another specific example, photo reactive binder can be present in the photo curable ink at from 1 wt % to 20 wt %, the photo active agent can be present in the photo curable ink at from 0.15 wt % to 5 wt %, the co-photo active agent can be present in the photo curable ink at from 0.01 wt % to 10 wt %, the pigment can be present in the photo curable ink at fro 0.5 wt % to 10 wt %, and the liquid vehicle can include from 0.1 wt % to 50 wt % of organic co-solvent. In further detail regarding an example photo curable ink, the photo active agent composition can be a sensitizer and the co-photo active agent can be a photo initiator. In another example, the photo active agent can be a photo initiator, and the co-photo active agent can be a synergist (such as an amine synergist) or a sensitizer for the photo initiator. In one specific example, the photo active agent composition be that shown above as Structure III above, where A and A' both include a 2,4,6-trimethyl benzyl group.

The photo curable ink can have a pH of 7 to 12. At these pH levels, the photo active agent composition can be stable in the photo curable ink. Also at this pH, typically, the bisacylphosphinic compound may be in the salt form, with a monovalent or divalent cation, such as an alkali metal or an alkaline earth metal, as the cationic portion of the salt, e.g., where M is a monovalent cation or divalent cation. In some examples, the UV-curable ink composition can be a basic aqueous ink. In one example, the UV-curable ink composition can have a pH of 7 to 11.5. In further examples, the UV-curable ink composition can have a pH of 7.5 to 10.5, or 8 to 9. In further detail, the photo curable ink can be photo curable within the UV range, or more specifically, at from 350 nm to 420 nm, or even more specifically using commercially available UV LED electromagnetic radiation sources at 365 nm or 395 nm.

The photo reactive binder can include a polyurethane. For example, the polyurethane can include hydrophobic radiation-curable monomer(s). In another example, the UV reactive binder can include a water dispersible (meth)acrylated polyurethane, such as NeoRad® R-441 by NeoResins (Avecia). Other examples of UV reactive binders can include Ucecoat® 7710, Ucecoat® 7655 (available from Cytec), Neorad® R-440, Neorad® R-441, Neorad® R-447, Neorad® R-448 (available from DSM NeoResins), Bayhydrol® UV 2317, Bayhydrol® UV VP LS 2348 (available from Bayer), Lux 430, Lux 399, Lux 484 (available from Alberding Boley), Laromer® LR 8949, Laromer® LR 8983, Laromer® PE 22WN, Laromer® PE 55WN, Laromer® UA 9060 (available from BASF), or combinations thereof.

In some examples, if a polyurethane is used for the photo reactive binder, the polymer may include various structures. For example, reactive polyurethane dispersions can include polymer strands with acrylate or methacrylate reactive groups in capping units at the ends of the strands. In some examples, a reactive polyurethane dispersion can include a polymer strand that has a polymer backbone having two ends terminating at a first capping unit and a second capping unit. The polymer backbone can be formed of polymerized monomers including: a reactive diol selected from an acrylate-containing diol, a methacrylate-containing diol, or combination thereof; and a blend of two or more diisocyanates. The first capping unit can be an acrylate-containing or methacrylate-containing monoalcohol reacted with an isocyanate group of one of the diisocyanates. The second capping unit can be an ionic stabilizing group. The polymer backbone can be devoid of ionic stabilizing groups.

In another example, a reactive polyurethane dispersion can include a polymer strand that has a polymer backbone having two ends terminating at a first capping unit and a second capping unit. The polymer backbone can be formed of polymerized monomers including: a blend of two or more diisocyanates and a reactive diol. The first capping unit can be an acrylate-containing monoalcohol or a methacrylate-containing monoalcohol reacted with an isocyanate group of one of the two or more diisocyanates. The second capping unit can be an ionic stabilizing group.

Diisocyanates and diols can be polymerized to form a polymer backbone of alternating polymerized diisocyanate and diol groups. The capping units can be added at each end of the polymer backbone by introducing a monofunctional monomer. In various examples, the monofunctional monomer can be a monoalcohol or monoamine that reacts with the unreacted isocyanate groups of the diisocyanate monomers at the ends of the polymer backbone. In certain examples, the polymer strand can include different capping units at each end of the polymer strand. This is shown in Formula (V). However, in other examples, the polymer strand can have two identical capping units.

In another example, the polyurethane can include an acrylate-containing or methacrylate-containing monoalcohol bonded to the polymer backbone at one end, and an ionic stabilizing group bonded to the polymer backbone at the other end. The polymer may also or alternatively include an acrylate-containing or methacrylate-containing monoalcohol bonded to both ends of the polymer backbone. In still other examples, the polyurethane can include an ionic stabilizing group bonded to both ends of the polymer backbone. In one example, the reactive polyurethane dispersion can include a majority of polymer strands with an acrylate-containing or methacrylate-containing monoalcohol bonded to one end of the polymer backbone and an ionic stabilizing group bonded to the other end of the polymer backbone. These polymer strands can have the advantage of improved dispersion stability due to the ionic stabilizing group and the advantage of the acrylate or methacrylate group in the capping unit participating in UV-curing to increase the durability of the cured polyurethane. The reactive polyurethane dispersion can also include smaller amounts of polymer strands having acrylate-containing or methacrylate-containing capping units at both ends and polymer strands having ionic stabilizing groups at both ends. In one example, more than 50% of the polymer strands in the reactive polyurethane dispersion can have the acrylate-containing or methacrylate-containing monoalcohol at one end and the ionic stabilizing group at the other end.

In further detail, reactive polyurethane dispersions may be more pH-stable when particular types of monomers are included or not included in the polymer backbone and the capping units. In one example, the polymer backbone can be free of ionic stabilizing groups. In particular, the polymer backbone can be devoid of monomers that contain acidic functional groups. In this example, the reactive polyurethane dispersion can include ionic stabilizing groups in the capping units, but not on the polymer backbone. In a specific example, the polymer backbone can be devoid of carboxylate and sulfonate groups.

The polyurethane dispersions can have a NCO/OH ratio of 1.2 to 10. In another example, the reactive polyurethane dispersion can have a NCO/OH ratio of 2 to 3. As used herein, "NCO/OH ratio" refers to the mole ratio of NCO groups to OH groups in the monomers that react to form the polymer backbone.

In still further examples, if a reactive polyurethane dispersion is used as the photo reactive binder, the polymer may have a double bond density of 1.5 to 10. In other examples, the reactive polyurethane dispersion can have a double bond density of 2 to 10, 3 to 10, or 4 to 10. As used herein, "double bond density" refers to the number of millimoles of double bonds in 1 g of the polyurethane polymer by dry weight.

The reactive polyurethane dispersions described herein can have an acid number from 20 to 100. In further examples, the reactive polyurethane dispersion can have an acid number from 25 to 80, from 30 to 60, or from 35 to 50. As used herein, "acid number" refers to the number of milligrams of potassium hydroxide required to neutralize one gram of the polyurethane dispersion, by solid weight.

In some examples, the reactive polyurethane dispersions, if used as the photo reactive binder, may have a minimum film-forming temperature from −50° C. to 80° C. In other examples, the reactive polyurethane dispersions can have a minimum film-forming temperature from −30° C. to 60° C. or from −25° C. to 50° C.

The molecular weight of the polyurethane can also be controlled. In some examples, the reactive polyurethane dispersion can have a weight average molecular weight $M_w$ from 1,000 to 50,000. In further examples, the reactive polyurethane dispersion can have a Mw from 2,000 to 25,000 or from 3,000 to 10,000.

Turning now to the co-photo active agent, this component can be a photo initiator, a synergist, or a sensitizer. If the bisacylphosphinic compound photo active agent (see Structure I) is a photo initiator, then the co-photo active agent can be a sensitizer or a synergist. As a sensitizer, the co-photo active agent can assist in making the photo active agent sensitive to UV light at wavelength. An example of a sensitizer is 2-isopropyl thioxanthone. As a synergist, the co-photo active agent can generate radicals during photo curing of the bisacylphosphinic compound photo active agent, such as with UV curing or even UV-LED curing processes. In some examples, the synergist can be an amine synergist. The amine synergist can be a tertiary amine compound. In one example, the amine synergist can be a polymeric amine synergist such as a derivative of aniline and a polyether amine such as Jeffamine® 900 from Huntsman Chemical. In other examples, the amine synergist can be trimethylamine, triethanolamine, methyldiethanolamine, phenyldiethanolamine, N,N,N',N'-tetra(hydroxylethyl)ethylenediamine, dimethylaminoethyl acrylate, dimethylaminoethyl methacrylate, ethyl dimethylaminobenzoate, or combinations thereof. In still another example, the photo active agent of the present disclosure can likewise act as the primary photo initiator in the photo curable ink, and thus, in some cases, the co-photo active agent can be a second photo initiator. Alternatively, the co-photo active agent can be a photo initiator, and the photo initiator of the present disclosure, e.g., Structure I, can be a sensitizer for the photo initiator. Examples of radical photo initiators (as the co-photo active agent) that may be used in either of these contexts can include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl)phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations thereof. Non-limiting examples of additional photo initiators include alpha amino ketone UV photo initiators such as Ciba® Irgacure® 907, Ciba® Irgacure® 369, and Ciba® Irgacure® 379; bis acylphosphine oxide (BAPO) UV photo initiators such as Irgacure® 819, Darocur® 4265, and Darocur® TPO; alpha hydroxy ketone UV photo initiators such as Irgacure® 184 and Darocur® 1173; including photo initiators with or without sensitizers. An example of a sensitizer includes Darocur® ITX (2-isopropyl thioxanthone) from BASF.

The colorant in the photo curable ink can be a pigment, a dye, or a combination thereof. In some examples, the colorant can be present in an amount from 0.5 wt % to 10 wt % in the photo curable ink. In one example, the colorant can be present in an amount from 1 wt % to 5 wt %. In another example, the colorant can be present in an amount from 5 wt % to 10 wt %.

In some examples, the colorant can be a dye. The dye can be nonionic, cationic, anionic, or a mixture of nonionic, cationic, and/or anionic dyes. Specific examples of dyes that can be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following black pigments are available from Cabot: Monarch® 1400, Monarch® 1300, Monarch® 1100, Monarch® 1000, Monarch® 900, Monarch® 880, Monarch® 800, and Monarch® 700. The following pigments are available from CIBA: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure® R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the UV curable ink. Additionally, the colorant can include a white pigment such as titanium dioxide, or other inorganic pigments such as zinc oxide and iron oxide.

The components of the photo curable ink can be selected to give the ink good ink jetting performance. Besides the photo curable binder, photo active materials of the various types described, and the colorant, the photo curable ink can also include a liquid vehicle. Liquid vehicle formulations that can be used in the photo curable ink can include water and one or more co-solvents present in total at from 1 wt % to 50 wt %, depending on the jetting architecture. Further, one or more non-ionic, cationic, and/or anionic surfactant can be present, ranging from 0.01 wt % to 20 wt %. In one example, the surfactant can be present in an amount from 5 wt % to 20 wt %. The liquid vehicle can also include dispersants in an amount from 5 wt % to 20 wt %. The balance of the formulation can be purified water, or other vehicle components such as biocides, viscosity modifiers, materials for pH adjustment, sequestering agents, preservatives, and the like. In one example, the liquid vehicle can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and/or 1,5-pentanediol.

One or more surfactant can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; LEG-1, and sodium dodecylsulfate.

Consistent with the formulation of this disclosure, various other additives can be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives to modify properties of the ink as desired. Such additives can be present at from 0.01 wt % to 20 wt %.

Table A shows the composition of an example of a photo curable ink formulation, e.g., UV LED curable ink, in accordance with the present disclosure. The ink can be formulated by mixing these ingredients or by mixing other similar formulations. The pH of the ink can then be adjusted. In one example, the ingredients can be stirred for 30 minutes, and then aqueous potassium hydroxide can be added to adjust the pH to 7 to 12, or in one example, about 8.5. It is noted that though water concentrations are listed as "balance," it is understood that the balance of components could included other liquid vehicle components or minor amounts of solids often present in inkjet ink compositions.

TABLE A

| Component | Concentration (Wt %) |
| --- | --- |
| Photo reactive binder (UV reactive polymer) | 1-20 |
| Sensitizer or Photo Initiator of Structure I (photo active agent) | 0.15-5 |
| Photo initiator (co-photo active agent) | *0-10 |
| Synergist (co-photo active agent) | *0-10 |
| Sensitizer (co-photo active agent) | *0-10 |
| Surfactant | 0-20 |
| Anti-kogation agent | 0-5 |
| Pigment | 0.5-10 |
| Organic Co-solvent | 0.1-50 |
| Water | balance |

*As noted, when the photo active agent is included as a sensitizer, the co-photo active agent is a photo initiator and is at greater than 0%, e.g. from 0.01 w %. When the photo active agent is included as a photo initiator, one or more of the co-photo active agent ingredients is at greater than 0%, e.g., from 0.01 wt %. All four components can likewise be present, namely the photo active agent and all three of the co-photo active agents, or any combination thereof. In one example, the co-photo active agent can be present at from 0.01 wt % to 10 wt %.

The photo curable ink can be used to print on a broad selection of substrates including untreated plastics, flexible as well as rigid, porous substrates such as paper, cardboard, foam board, textile, and others. The ink has a good adhesion on a variety of substrates. The photo curable ink also has a good viscosity, enabling good printing performances and the ability to formulate inks suitable for inkjet application. In some examples, the ink can be formulated for thermal inkjet printing. The photo curable ink composition of the present disclosure enables high printing speed and is very well suited for use in digital inkjet printing.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "photo active agent" refers to the bisacylphosphinic compounds described herein and generally shown at Structure I. The photo active agent can function in a photo curable ink as a photo initiator and/or as a sensitizer for another photo initiator. As a photo initiator, this compound can participate in the initiation of photo polymerization when exposed to UV light. As a sensitizer, the photo active agent can assist in making a separate photo initiator sensitive to UV light at wavelength. In some examples, when the bisacylphosphinic compound is prepared in accordance with the methods described herein, the photo active agent can be present in a composition with small or residual amounts of a dialcohol phosphinic acid precursor, or salts thereof.

The term "co-photo active agent" refers to a secondary component that may be present in the photo curable inks along with the bisacylphosphinic compound photo active agent. This secondary component can be a photo initiator, a synergist, or a sensitizer, and is considered to be a "co"-photo active agent because it interacts chemically with the photo active agent during photo curing of the photo curable ink. In one example, if the photo active agent is a photo initiator, the co-photo active agent can be a photo initiator, a synergist, or a sensitizer. In another example, if the photo active agent is a sensitizer, the co-photo active agent can be a photo initiator. Any combination of co-photo active agents can be present, including one, two, or all three types of co-photo active agents.

The term "residual" refers to small amounts of material that remain in a final composition due to incomplete reaction or other condition where not all of that material is consumed, e.g., a starting material or intermediate material. The range of residual material can be from 0.001 wt % to 5 wt %, for example.

As used herein, "UV curable" refers to compositions that can be cured by exposure to ultraviolet light from any UV source such as a mercury vapor lamp, UV LED source, or the like. Mercury vapor lamps emit high intensity light at wavelengths from 240 nm to 270 nm and 350 nm to 380 nm. "LED curable" refers to compositions that can be cured by ultraviolet light from an ultraviolet LED. Ultraviolet LEDs emit light at specific wavelengths. For example, ultraviolet LEDs are available at from 350 nm to 420 nm, e.g., at 365 nm and 395 nm wavelengths. The term "photo curable" refers generally to compositions that can be cured by exposure to light from any wavelength suitable for the composition being cured. Typically, the photo curable composition will be UV curable, and in some cases UV LED curable.

As used herein, "liquid vehicle" or "ink vehicle" refers to a liquid fluid in which colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific example, however, the pigment is a pigment colorant.

As used herein, "ink-jetting" or "jetting" refers to compositions that are ejected from a jetting pen or architecture, such as an ink-jet pen or architecture. Ink-jetting or jetting can include thermal or piezo jetting. Additionally, such architecture can be configured to print varying drop sizes such as less than 5 picoliters, less than 10 picoliters, less than 20 picoliters, less than 30 picoliters, less than 40 picoliters, less than 50 picoliters, etc.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

Percentages are in weight percent unless otherwise noted or the context dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of bis-[hydroxy-(2,4,6-trimethyl-phenyl)-methyl]-phosphinic Acid To a high-pressure reaction tube was added mesitaldehyde (45 g, 300 mmol, 3 equivalents), hypophosphorous acid (50% in $H_2O$, 13.26 g, 100 mmol, 1 equivalent), and a stir bar. The tube was sealed and heated while stirring at 100° C. for 4 h. After this time, heating was discontinued and the very viscous dark yellow reaction mixture was diluted in $CHCl_3$ and washed with water, then brine. The organic layer was dried over $Na_2SO_4$, filtered and concentrated. The resultant mixture was purified by column chromatography (gradient from hexanes to 5% EtOH). This purification removed the residual unreacted aldehyde (very non-polar) and the desired product was collected in the second fraction (frB). The product was obtained in 55% yield (20 g) and LC-MS results confirmed the product to be around 65% (the purity level may be slightly inaccurate due to unidentifiable "impurities" that may result from the LC-MS process). This process is shown generally as follows.

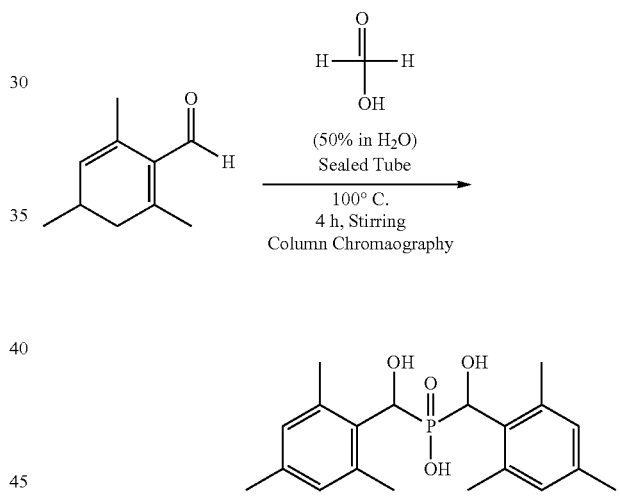

Example 2—Preparation of bis-[(2,4-dichloro-phenyl)-hydroxy-methyl]-phosphinic Acid To a high-pressure reaction tube was added 2,4-dichlorobenzaldehyde (25 g, 143 mmol, 3 equivalents), hypophosphorous acid (50% in $H_2O$, 6.28 g, 48 mmol, 1 equivalent) and a stir bar. The tube was sealed and heated while stirring at 100 degrees C. for 4 h. After this time, heating was discontinued and the very white solid residue was diluted in $CHCl_3$/acetone and EtOAc until it was able to be removed. The solid material was then concentrated and residual aqueous solvent was filtered off. This was followed by copious washing with $CHCl_3$ to remove the unreacted aldehyde starting material. TLC examination showed this purification method to be very good. The product was obtained in 95% yield (19 g) and LC-MS results confirmed the product to be pure. This process is shown generally as follows.

17

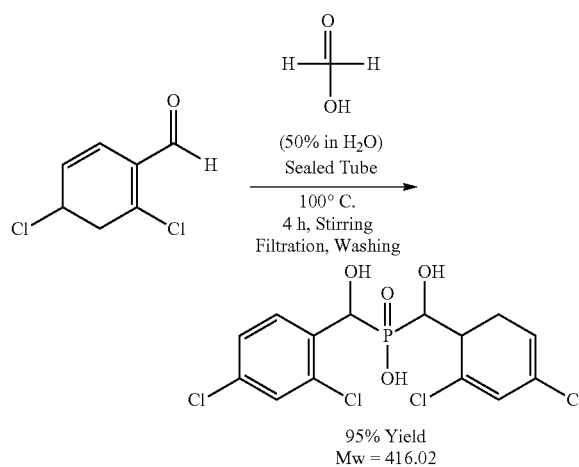

Example 3—Preparation of
bis-(hydroxy-phenyl-methyl)-phosphinic Acid

To a high-pressure reaction tube was added benzaldehyde (30 g, 283 mmol, 2 equivalents), hypophosphorous acid (50% in H$_2$O, 9.3 g, 141 mmol, 1 equivalent) and a stir bar. The tube was sealed and heated while stirring at 100 degrees C. for 4 h. After this time, heating was discontinued and the white solid reaction mixture was removed. This solid product was collected, crushed into a powder and washed with hexanes to remove unreacted benzaldehyde. The desired product was collected (20 g, 52% yield) and LC-MS results confirmed the product to contain 84% product and 16% of an impurity. Recrystallization or further washing with a more polar solvent may help increase this purity level. This process is shown generally as follows.

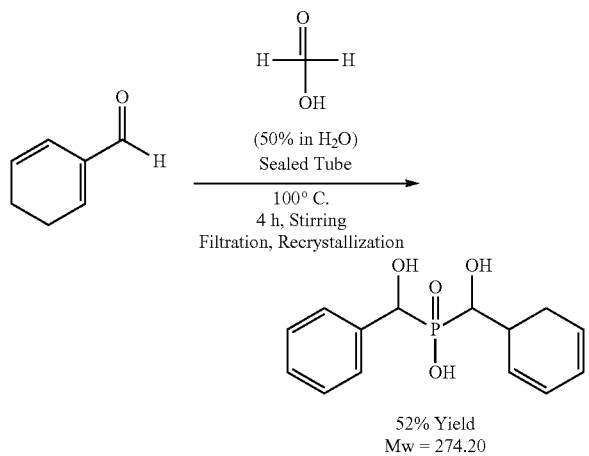

Example 4—Preparation of
bis-(1-hydroxy-hexyl)-phosphinic Acid

To a high-pressure reaction tube was added hexanal (30 g, 300 mmol, 2 equivalents), hypophosphorous acid (50% in H$_2$O, 19.8 g, 150 mmol, 1 equivalent) and a stir bar. The tube was sealed and heated while stirring at 100 degrees C. for 4 h. After this time, heating was discontinued and the reaction

18 mixture was removed. The liquid solution was filtered from the solid waxy material which was isolated. The waxy product was collected (22 g, 55% yield) and LC-MS results confirmed the product to be fairly pure with two minor impurities. This process is shown generally as follows.

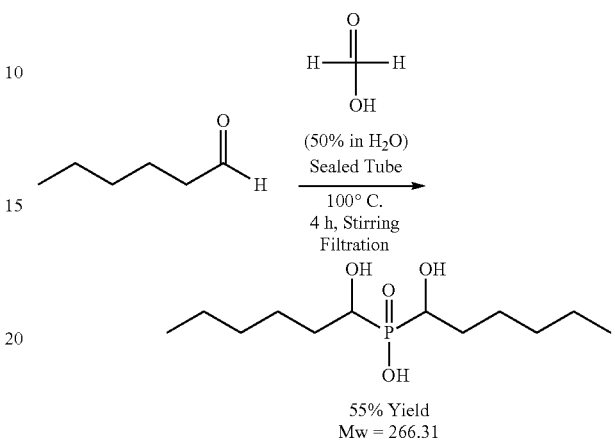

Example 5—Oxidation of bis-[hydroxy-(2,4,6-trimethyl-phenyl)-methyl]-phosphinic Acid 14 Using Air by Bpy/ABNO/NMI//[Cu(MeCN)$_4$]OTf A mixture of the bis-[hydroxy-(2,4,6-trimethyl-phenyl)-methyl]-phosphinic acid (0.5 g, 1.38 mmol) of Example 1, Stahl oxidation solution (4 ml, 0.138 mmol), and 80 mg of [Cu(MeCN)$_4$]OTf in 50 ml of CH$_3$CN was stirred under air for 48 hours. The mixture was evaporated off to give a residue, which was further purified by flash chromatography, giving rise to the bisacylphosphinic acid, at 0.275 gram (55%). The bisacylphosphinic acid can then be converted to the sodium salt by reaction with sodium hydroxide, as shown below. Notably, residual amounts of the dialcohol phosphinic acid (or in salt form) may remain present in the final composition.

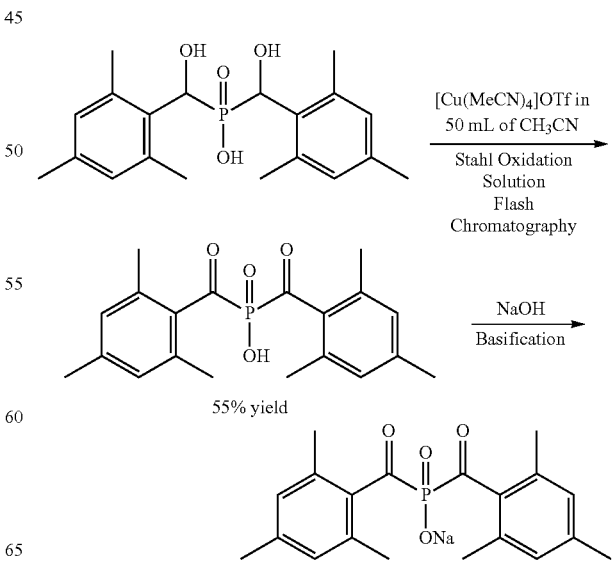

Example 6—Oxidation of bis-[hydroxy-(2,4,6-trimethyl-phenyl)-methyl]-phosphinic Acid 14 Using Trichlorotriazine by TEMPO A mixture of bis-[hydroxy-(2,4,6-trimethyl-phenyl)-methyl]-phosphinic acid (0.5 g, 1.38 mmol), trichlorotriazine (640 mg, 2.76 mmol) and 5 mg of TEMPO in 50 ml of CHCl₃ was stirred under air for 30 min. The mixture was evaporated off to give a residue, which was further purified by flash chromatography, giving rise to the bisacylphosphinic acid: 0.3 grams (60%). The bisacylphosphinic acid can then be converted to the potassium salt by reaction with potassium carbonate, as shown below. Notably, residual amounts of the dialcohol phosphinic acid (or in salt form) may remain present in the final composition.

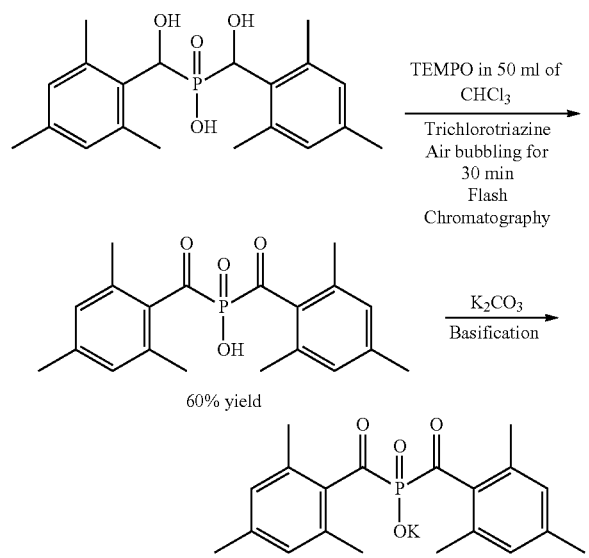

60% yield

Example 7—Preparation of Reactive Polyurethane (PUD 26)

A reactive polyurethane dispersion (PUD 26) was synthesized using the following procedure. 23.872 g of g of Bisphenol A glycerolate (1 glycerol/phenol) diacrylate (BGDA), 0.239 g of 4-methoxyphenol (MEHQ), 38.772 g of 4,4'-methylene dicyclohexyl diisocyanate (H12MDI), and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of dibutyltin dilaurate (DBTDL) were added to initiate the polymerization. Polymerization was continued for 3 hrs at 60° C. A 0.5 g sample was withdrawn for % NCO titration to confirm the reaction with equal or lower than theoretical % NCO value. Theoretical % NCO was 13.21%. 28.109 g of HPBMA, 0.281 g of MEHQ, and 19 g of acetone were mixed in a beaker and added to the reactor over 30 sec. 9 g of acetone was used to rinse off the residual monomers on the beaker and added to the reactor. The polymerization was continued for 3 hours at 50° C. 0.5 g of pre-polymer was withdrawn for final % NCO titration, which should be equal or lower than theoretical % NCO value. The theoretical % NCO was 3.42%. The polymerization temperature was reduced to 40° C. 9.248 g of taurine, 6.207 g of 50% NaOH, and 23.119 g of deionized water were mixed in a beaker until the taurine was completely dissolved. Taurine solution was added to the pre-polymer solution at 40° C. with vigorous stirring over 1-3 mins. The solution became viscous and slightly hazy. Stirring was continued for 30 mins at 40° C. The mixture became clear and viscous after 15-20 mins at 40° C. 195.390 g of cold deionized water was added to the polymer mixture in 4-neck round bottom flask over 1-3 mins with good agitation to form PUD dispersion. The agitation was continued for 60 mins at 40° C. The PUD dispersion was filtered through a 400 mesh stainless sieve. Acetone was removed with rotorvap at 50° C. (added 2 drops (20 mg) BYK-011 de-foaming agent if there was excessive foaming). The final PUD dispersion was filtered through fiber glass filter paper. Particle size measured by Malvern Zetasizer was 19.27 nm. The pH of the dispersion was 8.78. Solid content was 31.25%.

Example 8—Preparation of Reactive Polyurethane (PUD 247)

A reactive polyurethane dispersion (PUD 247) was synthesized using the following procedure. 33.545 g of g of Bisphenol A glycerolate (1 glycerol/phenol) diacrylate (BGDA), 0.335 g of 4-methoxyphenol (MEHQ), 43.585 g of 4,4'-methylene dicyclohexyl diisocyanate (H12MDI), and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of dibutyltin dilaurate (DBTDL) were added to initiate the polymerization. Polymerization was continued for 3 hrs at 60° C. A 0.5 g sample was withdrawn for % NCO titration to confirm the reaction. The measured NCO value was 10.35%. Theoretical % NCO was 10.55%. 15.939 g of HEAA (N-hydroxylethyl acrylamide, CAS #7646-67-5, purchased from Sigma Aldrich), 0.159 g of MEHQ, and 19 g of acetone were mixed in a beaker and added to the reactor over 30 sec. 9 g of acetone was used to rinse off the residual monomers on the beaker and added to the reactor. The polymerization was continued for 3 hours at 50° C. 0.5 g of pre-polymer was withdrawn for final % NCO titration. The measured NCO value was 2.45%. The theoretical % NCO was be 2.50%. The polymerization temperature was reduced to 40° C. 6.931 g of taurine, 4.652 g of 50% NaOH, and 34.653 g of deionized water were mixed in a beaker until the taurine was completely dissolved. Taurine solution was added to the pre-polymer solution at 40° C. with vigorous stirring over 1-3 mins. The solution became viscous and slightly hazy. Stirring was continued for 30 mins at 40° C. The mixture became clear and viscous after 15-20 mins at 40° C. 197.381 g of cold deionized water was added to the polymer mixture in 4-neck round bottom flask over 1-3 mins with good agitation to form PUD dispersion. The agitation was continued for 60 mins at 40° C. The PUD dispersion was filtered through a 400 mesh stainless sieve. Acetone was removed with rotorvap at 50° C. (added 2 drops (20 mg) BYK-011 de-foaming agent if there was excessive foaming). The final PUD dispersion was filtered through fiber glass filter paper. Particle size measured by Malvern Zetasizer is 32.6 nm. The pH of the dispersion was 7.5. Solid content was 29.08%. This PUD showed less than 0.4 unit pH drop after 1 week ASL.

Example 9—UV-LED Curable Ink Formulations

To test the properties of a photo active agent/photo initiator prepared in accordance with the present disclosure (BAPO-Na in particular from Example 5) compared to other photo initiators, various magenta ink were formulated with curable polyurethane dispersions of Examples 7 and 8, and the various photo initiators, as well as the BAPO-Na photo initiator of Example 5. These inks are shown in Tables 1A and 1B, as follows.

TABLE 1A

UV Curable Ink Formulations with Various Photo Initiators

| Ingredient | Concentration (wt %) |
|---|---|
| Polyurethane Dispersion (PUD 26) | 10 |
| Surfactant (Surfynol ® CT-211 from Air Products) | 0.6 |
| Surfactant (Capstone ® FS-35 from DuPont) | 0.25 |
| DIC-QA Magenta (14-SE-379 from DIC) | 4 |
| Photo Initiator (See Table 1B for Identity and Concentrations) | 0.5-1 |
| Sensitizer PEG-550 based sensitizer | 0.5 |
| Water | Balance |

TABLE 1B

Photo initiator Identity for UV-LED Curable Inks of Table 1

| | Ink A (wt %) | Ink B (wt %) | Ink C (wt %) | Ink D (wt %) | Ink E (wt %) | Ink F* (wt %) |
|---|---|---|---|---|---|---|
| TPA-Na | 0.5 | — | — | — | 0.5 | 0.5 |
| IrgaCura ® 819 from Ciba | — | — | — | — | 0.5 | 0.5 |
| [1]Comp. A | — | 0.5 | — | — | — | — |
| [1]Comp. B | — | — | 0.5 | — | — | — |
| BAPO-Na | — | — | — | 0.5 | — | — |

*Ink F is different than Ink E as it includes PUD 247 instead of PUD 26; and
[1]Comparative A and B are two different experimental Type 1 photo initiators.

Example 10—Chemical and Physical Properties of UV-LED Curable Inks A-F

Table 2 below shows the Accelerated Shelf Life (ASL) results for the curable magenta inks A-F as set forth in Example 9. All of the photo initiators showed good viscosity and particle size stability, while pH ASL stability was not as good, which may be attributable to the use of PUD 26 which is an acrylate based curable PUD. PUD 247 is an acrylamide based curable PUD, which showed better pH stability. Thus, Inks A-D can be modified with this alternative PUD to improve pH stability.

TABLE 2

ASL Properties of UV-LED Curable Inks A-F

| | Ink A | Ink B | Ink C | Ink D | Ink E | Ink F |
|---|---|---|---|---|---|---|
| | Initial | | | | | |
| pH | 8.41 | 8.28 | 8.33 | 8.42 | 8.39 | 8.85 |
| Viscosity | 2 | 2 | 2 | 2 | 2 | 2.2 |
| Mv Size | 0.119 | 0.117 | 0.12 | 0.121 | 0.121 | 0.118 |
| 95% Size | 0.209 | 0.22 | 0.213 | 0.213 | 0.212 | 0.231 |
| | 1 Week at 50° C. | | | | | |
| pH | 7.58 | 7.55 | 7.65 | 7.61 | 7.62 | 8.27 |
| Viscosity | 1.9 | 2 | 1.9 | 1.9 | 2 | 2.1 |
| Mv Size | 0.1172 | 0.1216 | 0.1205 | 0.1216 | 0.1207 | 0.1336 |
| 95% Size | 0.2118 | 0.213 | 0.225 | 0.213 | 0.21 | 0.241 |
| ΔpH | 0.83 | 0.73 | 0.68 | 0.81 | 0.77 | 0.58 |
| % Change Viscosity | −5 | 0 | −5 | −5 | 0 | −5 |
| % Change Mv Size | −2 | 4 | 0 | 0 | −1 | 13 |

"Mv" stands for volume weighted average size; and
"95% Size" refers to the 95$^{th}$ percentile size of particles (only about 5% of partciles are larger).

Example 11—Curing Efficiency of UV-LED Curable Inks A-F

Table 3 below demonstrates the curing efficiency of various photo initiators using several durability tests. As can be seen, the photo active agent (BAPO-Na used as a photo initiator in this example) used in Ink D showed excellent durability across the board, and was relatively equivalent to the performance of TPA-Na (in Ink A), control sample with TPA-Na and IrgaCure® 819 (Ink E), and modified control sample with PUD 247, TPA-Na, and IrgaCure® 819 (Ink F). Comparative Photo Initiators A and B, on the other hand, did not show very good IPA durability, and were less favorable with respect to Windex® Rub. The data is provided in Table 3, as follows:

TABLE 3

Curing Efficiency of UV-LED Curable Inks A-F

| | | | Visual Grades | | | | |
|---|---|---|---|---|---|---|---|
| Inks | OD | 75% Gloss | Eraser Rub | Windex ® Rub | 70% IPA | Quanta Wet | Tape Adhesion | Quanta Sutherland |
| Ink A | 1.68 | 80 | 2 | 1.5 | 1.5 | 0 | 0 | 4 |
| Ink B | 1.49 | 74 | 2 | 1.5 | 3.5 | 0 | 0 | 3 |
| Ink C | 1.54 | 76 | 2 | 2 | 3.5 | 0 | 0 | 4 |
| Ink D | 1.66 | 82 | 2 | 0.5 | 2 | 0 | 0 | 4 |
| Ink E | 1.58 | 80 | 2 | 1.5 | 2 | 0 | 0 | 5 |
| Ink F | 1.41 | 71 | 2.5 | 0 | 1 | 0 | 3 | 4 |

The print durability tests of Table 3 were performed and graded as follows:

Sample Preparation
1. The Photo Curable Ink was filled into a thermal inkjet pen.
2. Fixer was printed from a different pen right before the ink was printed. The fixer formulation was a solution of calcium propionate, calcium nitrate tetrahydrate, Surfynol® SEF, tetraethylene glycol, and water.
3. One substrate was evaluated, namely vinyl plastic.
4. The ink was immediately dried using a hot air blower for 5 seconds at 375° F.
5. The dried ink was then immediately cured at a speed of 25 feet per minute using a 16 W/cm² LED 395 nm wavelength (from Phoseon).

Durability Measurements
1. Eraser Rub Test was conducted using a CS-10 rubber eraser, 2 inch length, 1 weight (250 g), and 10 cycles. A visual scale of 0-5 was used to evaluate the results, with 0 being considered the best possible score.
2. Windex® Rub Test was conducted using 1 weight (250 g), 5 cycles, and a Crockmeter cloth. A visual scale of 0-5 was used to evaluate the results, with 0 being considered the best possible score.
3. 70% Isopropyl Alcohol (IPA) Test was conducted using 1 weight (250 g), 5 cycles, and a Crockmeter cloth. A visual scale of 0-5 was used to evaluate the results, with 0 being considered the best possible score.
4. Quanta Wet Test was conducted using water, no weight (0 g), 1 cycle, and a Crockmeter cloth. A visual scale of 0-5 was used to evaluate the results, with 0 being considered the best possible score.
5. Tape Adhesion Test was conducted using a checkerboard pattern tape applied and removed. A visual scale of 0-5 was used to evaluate the results, with 0 being considered the best possible score.
6. Quanta Sutherland Test was conducted using 4 lbs, 200 cycles, and Mellotex rubbing paper. A visual scale of 0-5 was used to evaluate the results, with 5 being considered the best possible score.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A photo active agent, comprising a bisacylphosphinic compound in the form of an acid or salt having Structure I:

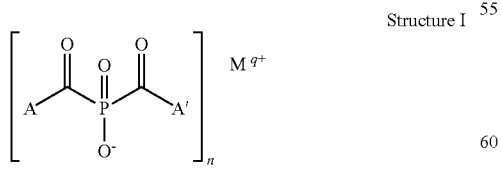

Structure I wherein A and A' are independently aryl or from C2 to C8 lower alkyl; M is H, a monovalent cation, a divalent cation, or mixture thereof; n is 1 or 2; and q is 1 or 2, and wherein the photo active agent is present in a composition that includes from 0.001 wt % to 5 wt % of a dialcohol phosphinic acid precursor or dialcohol phosphinic salt of the bisacylphosphinic compound of Structure I.

2. The photo active agent of claim 1, wherein A and A' both include a 2,4,6-trimethyl benzyl group; M is H, the monovalent cation, the divalent cation, or mixture thereof; n is 1 or 2; and q is 1 or 2.

3. The photo active agent of claim 1, wherein the bisacylphosphinic compound of Structure I is the acid, and M is H, n is 1, and q is 1.

4. The photo active agent of claim 1, wherein the bisacylphosphinic compound of Structure I is the salt, and M comprises lithium, sodium, potassium, magnesium, or calcium, wherein when M is lithium, sodium, or potassium, n and q are both 1, and wherein when M is magnesium or calcium, n and q are both 2.

5. A method of making a photo active agent, comprising:
reacting a phosphinic acid with an aryl or C2 to C8 lower alkyl adhehyde to form a dialcohol phosphinic acid precursor; and
oxidizing the dialcohol phosphinic acid precursor to form the photo active agent which comprises a bisacylphosphinic acid.

6. The method of calm 5, further comprising basifying the bisacylphosphinic acid to form a bisacylphosphinic salt.

7. The method of claim 5, wherein the photo active agent has Structure I:

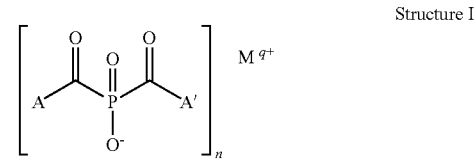

Structure I wherein A and A' are independently aryl or from C2 to C8 lower alkyl; M is H, a monovalent cation, a divalent cation, or mixture thereof; n is 1 or 2; and q is 1 or 2.

8. The method of claim 7, wherein the photo active agent is present in a composition that includes from 0.001 wt % to 5 wt % of a dialcohol phosphinic acid precursor or dialcohol phosphinic salt of the photo active agent of Structure I.

9. A photo curable ink, comprising:
a photo reactive binder;
a photo active agent comprising a bisacylphosphinic compound in the form of an acid or salt having Structure I:

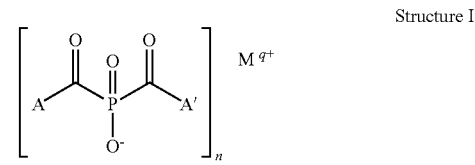

Structure I wherein A and A' are independently aryl or from C2 to C8 lower alkyl; M is H, a monovalent cation, a divalent cation, or mixture thereof; n is 1 or 2; and q is 1 or 2;
a co-photo active agent, wherein the co-photo active agent comprises a photo initiator, a synergist, or a sensitizer;
a dialcohol phosphinic acid precursor or dialcohol phosphinic salt of the photo active agent of Structure I;
a colorant; and
a liquid vehicle including co-solvent and water.

10. The photo curable ink of claim 9, wherein the bisacylphosphinic compound of Structure I is the salt, and M comprises lithium, sodium, potassium, magnesium, or calcium; wherein when M is lithium, sodium, or potassium, n and q are both 1; and wherein when M is magnesium or calcium, n and q are both 2.

11. The photo curable ink of claim 9, wherein the photo reactive binder is present in the photo curable ink at from 1 wt % to 20 wt %, the photo active agent is present in the photo curable ink at from 0.15 wt % to 5 wt %, the co-photo active agent is present in the photo curable ink at from 0.01 wt % to 10 wt %, the pigment is present in the photo curable ink at from 0.5 wt % to 10 wt %, and the liquid vehicle includes from 0.1 wt % to 50 wt % of organic co-solvent.

12. The photo curable ink of claim 9, wherein the photo reactive binder is a polyurethane.

13. The photo curable ink of claim 9, wherein the photo active agent is a sensitizer and the co-photo active agent is the photo initiator; or the photo active agent is a photo initiator and the co-photo active agent is the synergist or the sensitizer.

14. The photo curable ink of claim 9, wherein A and A' both include a 2,4,6-trimethyl benzyl group; M is H, the monovalent cation, the divalent cation, or mixture thereof; n is 1 or 2; and q is 1 or 2.

15. The photo curable ink of claim 12, wherein the photo reactive binder comprises a polyurethane polymer strand having an acrylate or methacrylate reactive group in a capping unit at an end of the polymer strand.

16. The photo curable ink of claim 15, wherein the polymer strand further comprises an ionic stabilizing group in a capping unit at another end of the polymer strand.

17. The photo curable ink of claim 12, wherein the photo reactive binder comprises a polyurethane polymer strand comprising polymerized monomers including a reactive diol and a blend of two or more diisocyanates, wherein the reactive diol is an acrylate-containing diol, a methacrylate-containing diol, or a combination thereof.

* * * * *